No. 671,108. Patented Apr. 2, 1901.
G. DÜRR.
SUPERHEATER.
(Application filed June 13, 1900.)
(No Model.)

Witnesses:
Edward Ray
William Schulz

Inventor:
Gustav Dürr
by his attorneys
Roeder & Brienen

UNITED STATES PATENT OFFICE.

GUSTAV DÜRR, OF DUSSELDORF, GERMANY.

SUPERHEATER.

SPECIFICATION forming part of Letters Patent No. 671,108, dated April 2, 1901.

Application filed June 13, 1900. Serial No. 20,139. (No model.)

*To all whom it may concern:*

Be it known that I, GUSTAV DÜRR, engineer, a citizen of Germany, and a resident of Dusseldorf, Germany, have invented certain new and useful Improvements in Superheaters, of which the following is a specification.

The object of my invention is a steam-superheater of an extremely-increased efficiency, where the steam is conducted through double pipes after having been relieved of the waste water.

The drawings accompanying this application illustrate my contrivance in two different forms of accomplishment.

Figure 1:
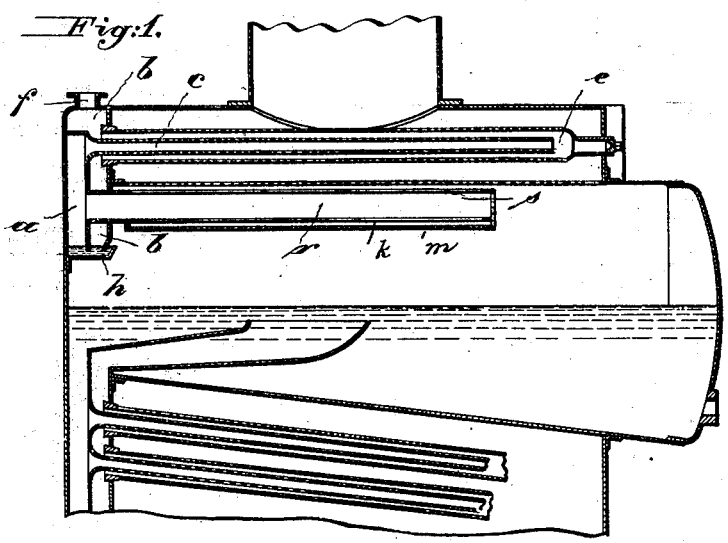
Figure 2:
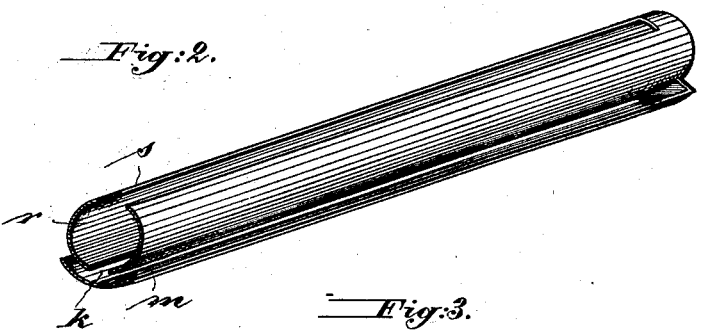
Figure 3:
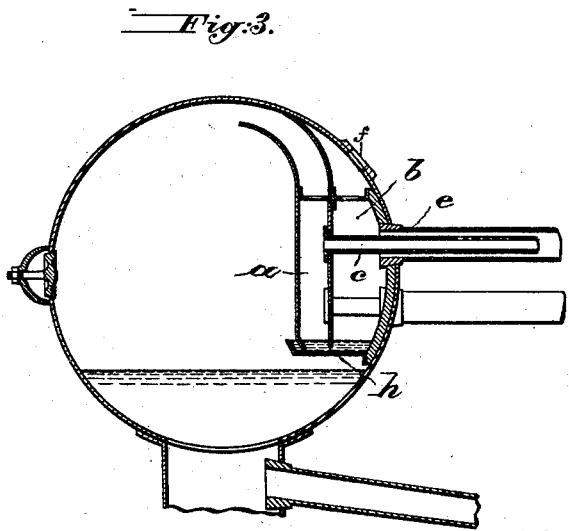

Figure 1 shows a length section of a superheater, the pipes of the same being arranged in longitudinal direction. Fig. 2 is a detail perspective view of slotted pipe $r$ and trough $m$, and Fig. 3 shows a cross-section of a superheater where the pipes are arranged in cross-direction to the boiler and the collector of the steam.

In using the device illustrated by Fig. 1 the steam is inducted through a pipe $r$, located inside of the collector of the steam and provided with a slot-inlet $s$. The pipe is connected with a comparatively large chamber $a$, into which it conducts the steam. With the other arrangement, which is illustrated by Fig. 3, the steam is conducted through the chamber $a$ direct. Both ways coincide in the steam leaving the chamber $a$ through a pipe $c$ and getting through the mouth of the latter into the pipe $e$ and from there into the chamber $b$. From the last-named place the steam is conducted through the crop $f$ to the place where it is intended to be used.

The following peculiar device is provided for the separation of the waste water—viz., the chambers $a$ and $b$ are open at the bottom, a groove or trough $h$ being provided underneath, filling with waste water until the latter is pouring over the brim. Both chambers are thus separated by the waste water, and the steam will have to enter through the slot $s$ of the pipe if the way illustrated by Fig. 1 is used, or at the top of the mantle if the structure shown by Fig. 3 is applied, the outlet at the bottom notwithstanding. With the form of accomplishment shown by Fig. 1 another outlet of the waste water may be provided below the pipe $r$. In this case the pipe has at its bottom side a slot or holes $k$, and under the same there is a groove or trough $m$. (Compare the perspective view of the pipe $r$ with the latter, Fig. 2.) The waste water is collected in this groove and shuts off the slot or hole $k$ of the pipe for the steam, forcing thereby the latter to enter from above. The waste water flows out over the sides of the groove or through a special outlet.

I claim—

1. A superheater with the double pipes $c$ and $d$ conducting the steam forward and back and with chambers $a$ and $b$ which are open at the bottom, a groove being provided underneath which is filling with waste water thereby closing the outlets and preventing the entering of the steam at this spot.

2. The above-described superheater with the chambers $a$ and $b$ and the pipes $c$ and $d$ being provided with an inlet-pipe $r$ for the steam with holes $k$ for the outlet of the waste water and a trough $m$ to receive the same and to shut off the holes $k$.

3. A superheater composed of a steam-chamber, a pair of communicating steam-pipes, a second steam-chamber, and a water-trough beneath the open bottom of the chambers, substantially as specified.

4. A superheater composed of a perforated steam-inlet pipe, a drip-water trough beneath the same, a steam-chamber, a pair of communicating steam-pipes, a second steam-chamber, and a water-trough beneath the open bottom of the chambers, substantially as specified.

Signed by me at Dusseldorf, Germany, this 17th day of May, A. D. 1900.

GUSTAV DÜRR.

Witnesses:
   WILLIAM ESSENWEIN,
   ALBERT LIEBER.